J. W. FOIZEY.
RELEASING MEANS FOR CAR COUPLINGS.
APPLICATION FILED JULY 11, 1910.
999,021.  Patented July 25, 1911.
2 SHEETS—SHEET 1.
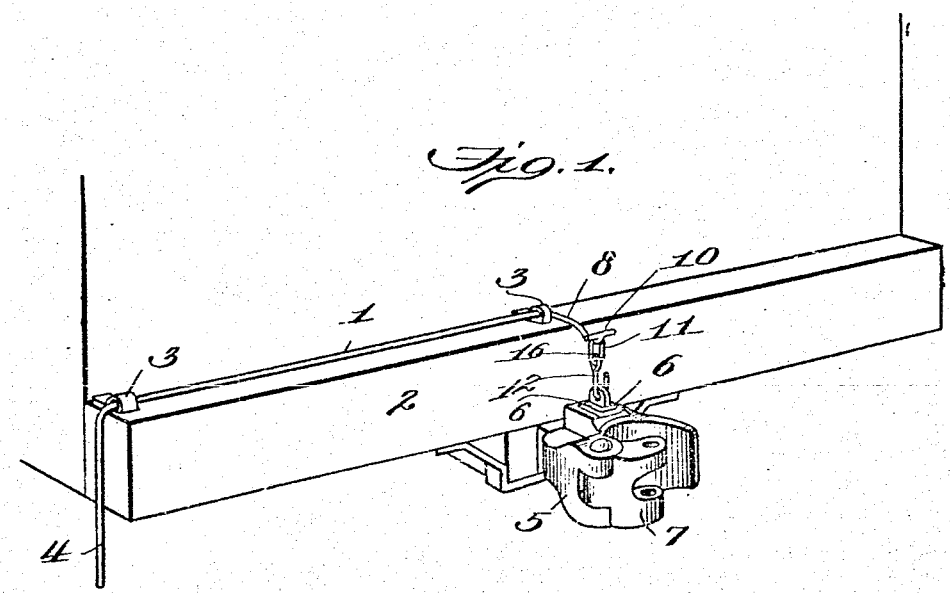
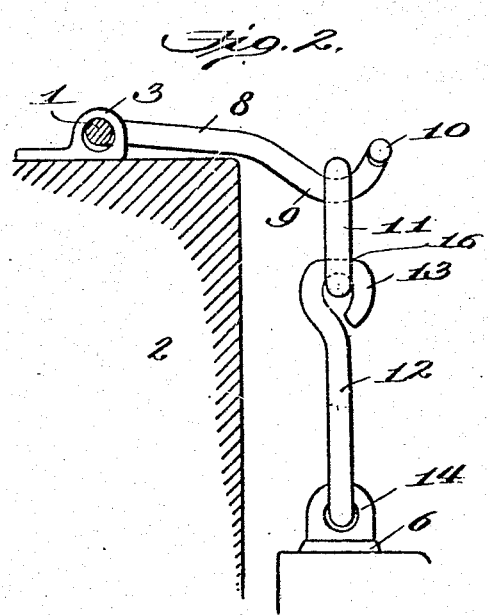 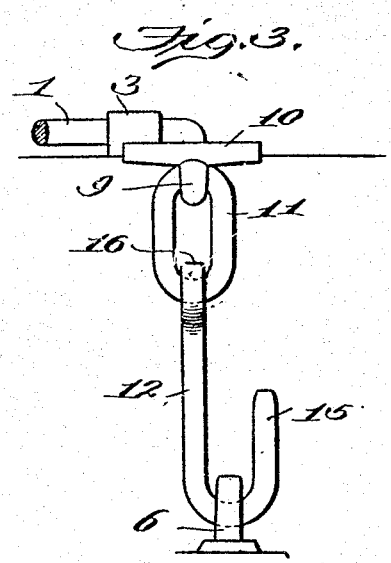
Witnesses
Inventor
James W. Foizey

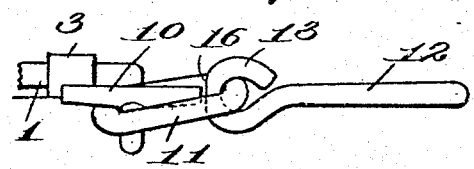
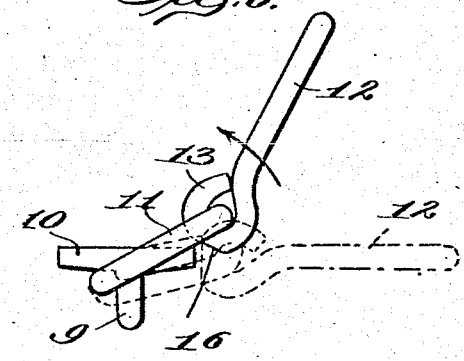
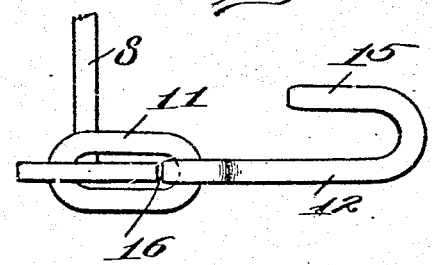
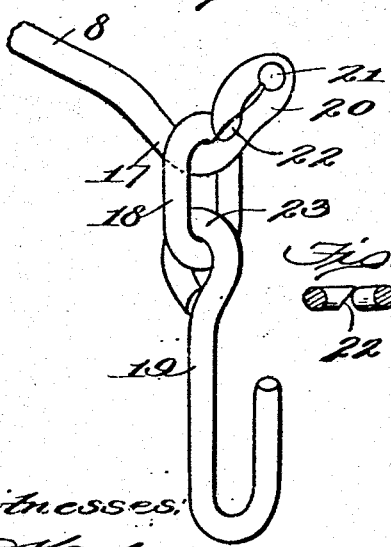
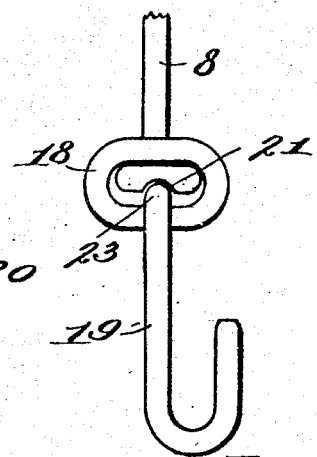

UNITED STATES PATENT OFFICE.

JAMES W. FOIZEY, OF NEWPORT NEWS, VIRGINIA, ASSIGNOR OF ONE-THIRD TO EDWIN IVINHOE FORD, OF NEWPORT NEWS, VIRGINIA.

RELEASING MEANS FOR CAR-COUPLINGS.

999,021. Specification of Letters Patent. Patented July 25, 1911.

Application filed July 11, 1910. Serial No. 571,468.

*To all whom it may concern:*

Be it known that I, JAMES W. FOIZEY, a citizen of the United States, residing at Newport News, in the county of Warwick and State of Virginia, have invented new and useful Improvements in Releasing Means for Car-Couplers, of which the following is a specification.

My present invention relates to improvements in releasing means for car couplers and more especially to the type employing a release rod which is operatively connected at its inner end to the coupling pin and extends to and is operable from one or both sides of the car, and it has for its object to provide simple and improved constructions for the release rod and the means for connecting it to the coupling pin whereby such connection will be maintained in proper order under ordinary service conditions without liability of becoming detached but which, when manipulated in a certain manner by a workman, may be readily disconnected and connected for the purposes of repair or otherwise, the present invention avoiding the necessity of using the usual clevis, pin and cotter key which have been found troublesome to railroads owing to liability of the cotter pin becoming detached and thereby rendering the releasing means inoperative.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of the end of a car equipped with coupler releasing means constructed in accordance with my invention; Figs. 2 and 3 are detailed views showing on an enlarged scale the inner end of the release rod and the operative connection between the release rod and the coupling pin; Figs. 4, 5 and 6 are diagrammatic views showing the manner in which the connection may be manipulated with respect to the release rod so as to disengage such parts; Fig. 7 is a perspective view of another form of the invention; Fig. 8 is a view of the parts shown in Fig. 7, the head, however, being presented edgewise and illustrating the manner in which the connection may be manipulated to detach it from the release rod; and Fig. 9 represents a detail sectional view through the head on the release rod as shown in Figs. 7 and 8.

Similar parts are designated by the same reference characters in the several views.

In the accompanying drawing, I have shown coupler releasing means which is adapted to be used in connection with the ordinary or standard couplers and, in the present instance, I have shown a release rod 1 which may be mounted in a suitable manner upon the car, it being shown in the present instance as mounted upon the top of the car end sill 2 by bearings 3, the release rod having a handle 4 at the side of the car whereby the coupler may be released without the necessity of the operator entering between the cars. The present invention is adapted for use in connection with any form of coupler using a pin, the coupler 5 shown in the present instance being of the ordinary type and having the usual vertically movable pin 6 which locks and unlocks the usual knuckle 7.

In that form of the invention shown in Figs. 1-6 inclusive, the arm or crank 8 which is formed on the inner end of the release rod 1 projects to a position above the pin of the coupler. This arm is provided with a downward bend or offset 9 which forms a seat in which the connecting means for the coupler pin rests normally, and the end of the arm 8 is provided with a head 10 which in this form of the invention embodies a cross bar which extends transverse to the length of the arm 8 and it projects from the opposite sides thereof. Preferably, this bar projects equidistantly from the opposite sides of the arm 8. The means for connecting the arm on the release rod to the coupling pin consists according to the present invention of a loop or link 11 which normally hangs or is suspended in the downward bend or depression 9 of the arm 8, and a hook 12 is non-detachably connected to the link 11 preferably by an eye 13, and the hook is detachably engaged in the eye or opening 14 which is formed in the pin coupler. The length of the bill 15 of the hook is such that the hook cannot disengage from the coupling pin when any ordinary amount of slack occurs in the connection between the coupling pin and the release rod. In order to release the coupler, it is only necessary to swing the handle 4 on the release rod upwardly, the arm 8 being thereby lifted, and this movement will be transmitted to the link 11 and the hook 12, the latter operating to lift the coupling pin. When the release rod returns to its normal position, the tension on the link 11 and hook 12 is relieved and the pin of the coupler may drop into its normal locking position. While some considerable slack may occur between the arm 8 and the parts 11 and 12, the link 11 cannot become disengaged from the end of the arm 8 for the reason that the weight of the hook 12 and the coupling pin serves to automatically retain the link 11 in such a position that its major or longer axis is vertical, this link being preferably elongated or flattened in one direction. In order to provide for the detachment of the link 11 from the arm 8, a certain portion of the eye 13 of the hook (preferably the top thereof) is cut away or reduced in size as at 16. By first disengaging the hook 12 from the coupling pin, the hook 12 is swung into an approximately horizontal position as shown in Fig. 4, the link 11 being thereby carried into a position that will bring its longer diameter substantially parallel with the cross piece 10 on the arm 8, and the flattened reduced or cut-away portion 16 formed on the eye 13 of the hook will be presented to one end of the cross piece 10. This cross piece is of such a length that it will just allow that end of the link 11 to which the hook is attached to pass over one of its ends when the flattened portion 16 of the hook is presented to such end of the cross piece, and the final movement to disengage the link and hook may then be accomplished as shown in Fig. 6. Unless, however, the hook is supported in a horizontal position or substantially so, a disengagement between the link 11 and the arm 8 cannot take place for the reason that the remainder of the eye 13 on the hook is of such a thickness or size as to prevent its passing either end of the cross piece 10. Therefore, accidental disengagement between the link 11 and cross piece 10 cannot take place, as the force of gravity will tend to retain the hook in a vertical position and it is practically impossible to disengage the parts unless they are manipulated manually.

In that form of the invention shown in Figs. 7 and 8, the arm 8 on the release rod is preferably provided as in the previous instance with a downwardly bent or depressed portion 17 to normally form a seat for the link 18 which suspends the hook 19, the latter as in the previous instance being adapted to directly engage the eye in the coupling pin. The end of the arm 8, however, is provided with a lateral enlargement of a somewhat different form, the material forming the arm 8 being bent into substantially the form of an eye or loop 20. This eye or loop 20 has a lateral dimension which is greater than the narrow diameter of the elongated or flattened link 18 although it has a dimension somewhat less than the longer diameter of the link 18. Normally, the weight of the hook 19, the coupling pin and the link 18 will retain the link 18 in the depression 17 and the longer diameter of the link 18 will be retained in a vertical position so that it will be impossible for the link 18 to slip over the eye or loop 20. When, however, it is necessary or desirable to detach the link 18 from the arm 8 of the release rod, the link 18 is turned by manual manipulation so as to bring its longer diameter into a horizontal position, and in order to permit the link and the hook attached to it to pass over the eye or loop 20, one of the parts is provided with a reduced portion to receive and register with the other part. In the present instance, the under side of the eye or loop 20 is formed with recesses 21 and 22 which are diametrically disposed and are adapted to receive the top of the eye 23 which connects the hook 19 to the link 18. By turning the link 18 into a position that will bring its longer diameter into a horizontal position and by placing the eye 23 of the hook 19 centrally beneath the eye or loop 20, the top of the eye 23 on the hook will register with and pass through the recesses 21 and 22 on the eye and in this manner, the link 18 can be readily detached from the release rod. The link and hook may be replaced in a similar way. Obviously, it will be practically impossible for the link and hook to assume such a position with respect to the eye on the release rod as to permit such parts to be accidentally disengaged.

I claim as my invention:—

1. The combination of an elongated link, a release rod having an arm provided with a laterally enlarged head engaging said link, and a coupling pin connecting member having an eye also engaging said link, said eye being coöperative with said head to lock the link thereto, one of said link-engaging parts having a reduced portion adapted to be presented to the other of said link-engaging parts to permit disengagement of the link from said head when said link is moved to an abnormal position.

2. The combination of a release rod having an arm provided with laterally enlarged head portions which project laterally to opposite sides of said arm, and means for detachably connecting said arm to a coupling pin embodying an elongated link coöperative with said arm, and a coupling pin engaging hook having an eye engaging said link, the longitudinal distance between one end of the link and the eye at the opposite end thereof being less, when the coupling pin engaging hook extends at an angle to the link, than the distance between said arm and the end of either head portion, the top of said eye having a reduced portion which when presented to the end of one of said head portions will permit the eye of the hook and the link to pass over said laterally enlarged head when the hook and link are placed in a substantially horizontal position.

In testimony whereof I have hereunto set my hand in presence of two subscribing witnesses.

JAMES W. FOIZEY.

Witnesses:
J. H. COOK,
H. F. PARKER.